United States Patent [19]
Meyer

[11] Patent Number: 5,304,051
[45] Date of Patent: Apr. 19, 1994

[54] PLASTICISING UNIT FOR A SCREW INJECTION MOULDING MACHINE HAVING IMPROVED VOLUME ADJUSTMENT MEANS

[75] Inventor: Paul Meyer, Ascona, Switzerland

[73] Assignee: Frenkel C-D Aktiengesellschaft, Basel, Switzerland

[21] Appl. No.: 720,070

[22] Filed: Jun. 24, 1991

[30] Foreign Application Priority Data

Mar. 26, 1991 [GB] United Kingdom ............ 9106384

[51] Int. Cl.$^5$ ............................................ B29C 45/77
[52] U.S. Cl. ................................... 425/145; 366/78; 366/88; 425/208
[58] Field of Search ............. 425/208, 145, 542; 366/78, 88

[56] References Cited

U.S. PATENT DOCUMENTS

| | | | |
|---|---|---|---|
| 2,744,287 | 5/1956 | Parshall et al. | 425/313 |
| 3,865,354 | 2/1975 | Burpulls et al. | 366/78 |
| 3,921,963 | 11/1975 | Neff et al. | 366/78 |
| 4,075,712 | 2/1978 | Geyer | 366/323 |
| 4,136,969 | 1/1979 | Meyer | 425/708 |
| 4,300,840 | 11/1981 | Kishiro | 366/88 |
| 4,311,446 | 1/1982 | Hold et al. | 425/145 |
| 4,326,255 | 4/1982 | Fujita | 425/145 |
| 4,462,692 | 7/1984 | Meyer | 366/79 |
| 4,557,683 | 12/1985 | Meeker | 366/78 |
| 4,695,165 | 9/1987 | Fukumizu et al. | 425/208 |
| 4,779,989 | 10/1988 | Barr | 366/88 |
| 4,889,478 | 12/1989 | Sato | 425/542 |
| 4,968,462 | 11/1990 | Hara | 425/145 |
| 5,102,587 | 4/1992 | Kumamura et al. | 425/145 |

FOREIGN PATENT DOCUMENTS

| | | | |
|---|---|---|---|
| 733861 | 5/1966 | Canada | 366/88 |
| 842692 | 7/1960 | United Kingdom | |
| 888864 | 2/1962 | United Kingdom | |
| 1585531 | 3/1981 | United Kingdom | |

*Primary Examiner*—Willard Hoag
*Attorney, Agent, or Firm*—Russell W. Warnock; Alan A. Csontos

[57] ABSTRACT

A plasticizing unit is provided for palsticizing material which is subsequently supplied to an injection molding press. The unit includes a screw disposed in a barrel which has an inlet, an outlet, a reservoir zone portion, and a plasticizing zone portion. The plasticizing zone portion of the barrel and the screw each have a continuous helical groove of opposite hand as the other groove and the grooves transfer material therebetween to effect plasticizing of the material. The reservoir zone portion of the barrel receives a shot volume of material which has been plasticized during passage through the helical grooves of the barrel and the screw. A volume displacement member which is axially movably disposed in a bore of the screw is movable within the reservoir zone portion to selectively control the shot volume of plasticized material received in the reservoir zone portion.

4 Claims, 1 Drawing Sheet

PLASTICISING UNIT FOR A SCREW INJECTION MOULDING MACHINE HAVING IMPROVED VOLUME ADJUSTMENT MEANS

BACKGROUND OF THE INVENTION

Injection molding machines for plastics and rubbers or visco-elastic materials generally are known, in which what is essentially a single screw extruder has a reservoir formed in its cylindrical barrel in front of the screw and in which the screw, which is movable axially as well as rotatably, serves to fill this reservoir and, upon being pushed backwards to a preset point, then serves as a piston in a positionally triggered, fast forward movement to inject the contents of the reservoir into the mold. This was first patented as DBP 858 310 in the 1960's.

A non-return valve at the tip of the screw is introduced in some constructions to enhance its injection action, though at the expense of some additional dead space.

This simplest plasticizing unit featuring basically a straight-through path along the axis of the screw, has as a drawback:

That the axial motion of the screw may not exceed about 4xD (D=screw diameter) in order not to have too short a length of the barrel in which the screw performs what plasticizing action it is capable of. In other words, the shot-volume is severely limited, size for size of the screw and barrel diameter.

To ameliorate this difficulty, two developments are known:

A. The complete extruder fills up a reservoir situated in front of its outlet opening, within a cylindrical housing in which the complete plasticizing unit (cylinder+screw+inlet) can be moved as a piston.

B. The extruder and reservoir are on separate center-lines and thus entirely separate but for a valved connection, where these center-lines may intersect, at the outlet of the extruder and leading to the injection reservoir which is provided with a piston for the actual injection.

Both of these developments, while usable for larger shot-volumes, result in much greater mechanical, driving and control-difficulties, and, especially the cylinder/ram version is said to present difficulties in setting the desired shot-volume as exactly as is possible with the simple screw-ram device.

Moreover, all three types generally have plain transport screws and provide the plasticizing action mainly by heat transfer from the barrel. As the practice of injection-molding has become more sophisticated, the demands on the uniformity of the plasticized material have increased, so that at this time non-uniformities in the different batches of what is ostensibly the same compound have shown negative effects in the molded products.

Accordingly, there is now a demand for a mixing-homogenizing action in the plasticizing units.

Furthermore, if two chemically different compounds could be introduced into the extruder and continuously mixed therein so completely as to form a very fast, and possibly lower temperature-reacting compound, the cycle times in the molds could be reduced materially. This would yield considerable improvements in productivity.

It is an object of this invention, for the simplest plasticizing unit of an injection molding machine where the ram action is carried out by the screw itself:

to eliminate the need for a non-return valve on the screw tip, and thereby the dead volume caused by the valve;

to maintain the same effective plasticizing length of the screw irrespective of the preset shot volume, —i.e. to overcome the limitation on the mold filling stroke, $s<4xD$;

to provide improved accuracy of shot-volume control both for large and particularly also for small shot-volumes;

to provide a mixing-homogenizing action together with more uniform plasticization which is adjustable to fit different requirements; to provide a mixing action adequate for the blending of two components which, on account of their chemistry, together provide a much faster vulcanization possibly also at lower temperature, and thus molding cycle time, than is possible for a single component compound on account of the need for storage and handling.

In order to achieve these objects, this invention provides:

A plasticizing screw and barrel comprising an inlet, a compression zone and a plasticizing zone embodying a Transfermix geometry according to British Patents No. 842,692 or No. 888,864 or No. 1,585,531 or No. 1,585,532 with a cylindrical interface between the lands of the grooves in the screw and in the barrel and having the generic feature that in the screw the helical groove varies in cross-section from full area to zero area and in the barrel the cross-section of groove varies from zero area to full area, whereby in the said plasticizing zone the material is transferred from the screw into the said barrel while being mixed and plasticized;

and a short second zone in which the flow area in the barrel outside of the cylindrical envelope of the screw reduces from full area to zero area for the material to be returned to within the cylindrical interface of the said barrel, the said barrel continuing with the same interior cylindrical shape to form a reservoir for plasticized material with a shaped end comprising a channel, generally centrally situated, for connection to the injection-mold, the said screw being axially moveable for the injection-action and with its section of zero area (depth) of its helical groove, on this having traversed said second zone, fitting the cylinder exactly like a piston for the said injection-action, trigger-means being provided to set off the said injection action and to stop rotation of the screw when the reservoir space is full.

It is a feature of a Transfermix plasticizing zone that its action may be intensified by throttling the flow of material through it, —the throttle in this case being formed by the said second (return) section between its ending, where the grooves in the barrel have zero depth, and the position on the screw where its grooves also have zero depth, where through the axial position of the screw for its plasticizing action the cylindrical area through which the material passes from the barrel grooves into the barrel may be adjusted to anything between a full opening—equal to the full cross-sectional area of the grooves in the barrel—and practically zero, this setting of the axial position of the screw being effected by positioning-means preferably integrated into the means providing for the axial motion of the injection-stroke.

In order to provide for the feature of adjustability of the shot-volume which in most cases will be required in practice, a preferred embodiment of the above may have the said screw comprise a central, generally cylindrical, core which is axially moveable relative to it, whereby with the screw in its axial position for plasticizing, the position of the said core is adjustable to define a shot-volume between a minimum of the annular space with the core fully extended through the cylindrical reservoir space in the barrel and touching the outlet end, and a maximum with the core fully retreated, equal to the full cylindrical reservoir space, the said core being adapted to actuate a trigger-means for setting off the injection-action of the screw as soon as the material, having filled the preset shot-volume, starts to push the core from its preset position backwards into the screw.

The said core and the said screw are provided with joining means which act to move the core forward with the screw as one body as soon as the head of the screw in its forward injection motion reaches the head of the core. The head of the screw and that of the core may be formed to present one continuous surface which may be shaped to exactly fit the exit end of the barrel-reservoir, in order to allow substantially no dead space with the screw forward. Alternatively the said trigger-means may be a pressure sensitive device fitted in the reservoir space and reacting directly to an increased pressure exerted by the material after having filling the preset shot-volume, in order to eliminate any motion of the core from its preset position prior to injection commencing and thereby to provide extreme accuracy in the shot-volume.

In another preferred embodiment, the head of the core may be left adjacent to the outlet end of the barrel, thereby forming a valve preventing a back-flow.

Moreover, in that position it may be adapted to exert a positive pressure on the material in the mold and to maintain such pressure for a period. In such an embodiment, after completion of the shot, the screw only will be withdrawn into its plasticizing position and will then start rotating for its next plasticizing action, filling up the annular space between the barrel and the core. After a timed delay, the core will be moved back to assume its preset position for the next shot. On account of the proven superior plasticizing efficiency of the Transfermix geometry, the screw lengths for plasticization need not be increased over the conventional, but may rather be reduced, enabling existing presses to be adapted by fitting the above units.

With the Transfermix being capable of operating also at higher screw speeds than usual in conventional plasticizing screws without causing excessive temperatures, relatively short screw lengths become possible, so that bigger diameter screws with bigger cores can be used also for smaller shot-volumes and cycle times, insofar as they depend on the time required to fill the reservoir, e.g. in carousel arrangements, can be reduced accordingly.

DETAILED DESCRIPTION OF THE PREFERRED EMBODIMENT

The invention will now be described by way of example and in some detail with reference to the accompanying drawing in which FIG. 1 is a cross-section through a plasticizing unit according to this invention.

Figure 1:
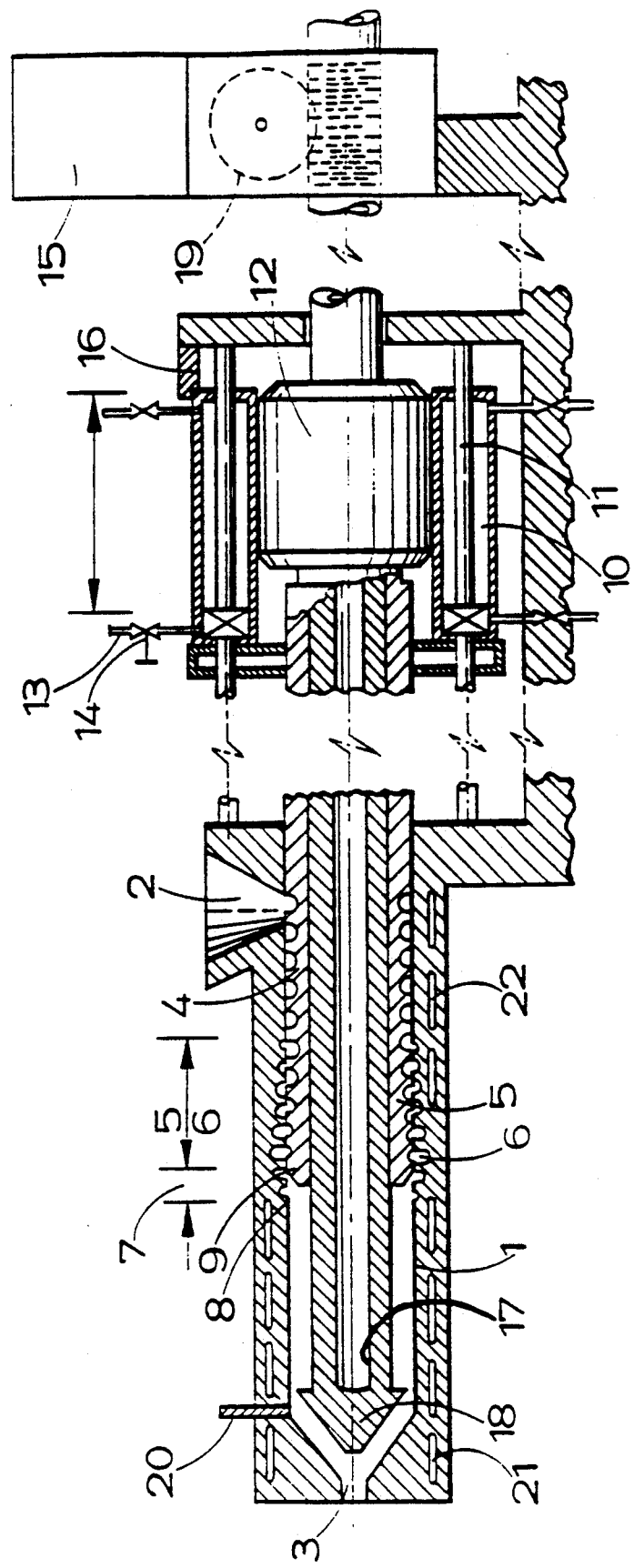
In FIG. 1, the barrel 1 comprises a feed-opening 2 and an exit-opening 3 which leads to the mold (not shown). A screw or rotor 4 comprises a Transfermix plasticizing section 5 and is shown in its withdrawn position in which with the plasticizing section 6 in the barrel it forms a transfer zone according to any of the above-named patents. In this, as the cross-sectional area of the helical grooves in the rotor reduce from full area to zero, the cross-sections of the opposite handed helical grooves of the barrel increase from zero to full. Thereby, while being plasticize and mixed, the contents of the rotor are transferred into the barrel. Following this is a section 7 of the barrel in which the cross-sectional area of the helical barrel grooves again reduces to zero, and in which the compound is moved into the reservoir space in front of the screw through the cylindrical space formed between the edge 8 of said section 7 and the piston edge 9 formed on the rotor where its helical grooves have reduced to zero. Depending on the axial position of the screw in the withdrawn position, this cylindrical space may be reduced to act as the throttle which is frequently part of a Transfermix.

Generally, the axial position of the rotor or screw 4 is determined by hydraulic cylinders 10 which are mounted on robust guide rods 11 and are connected via the motor 12 (generally a hydraulic motor) for rotating the screw and via suitable bearings, to the said screw.

The hydraulic cylinders 10 are actuated via hoses 13 and valves 14, which themselves are controlled by electronics in a control cabinet 15. A sensor-means 16 connected to the control cabinet 15 provides a presettable plasticizing position for the rotor such that the section 7 has an opening suitable to the compound having to be plasticized between fully open, as indicated on the drawing, and almost closed, in which case the screw will be farther forward than shown.

The rotor 4 is provided with a central bore in which a core 17 is mounted so as to be axially adjustable relative to the rotor. This is in order to define the shot-volume, between a minimum value equal to the angular space between core 17 and the interior of barrel 1 when the core 17 is in a fully extended position relative to rotor 4 and a maximum value equal to the full reservoir space within the barrel when the core 17 is withdrawn into the rotor 4.

The core 17 has an enlarged end 18, of which the front surface fits exactly into the interior shape of the barrel outlet and the back surface fits exactly onto the front of the rotor 4. This avoids dead space on injection.

The position of core 17 is determined by a positioning means 19 which is adjustable by the operator via the electronics in cabinet 15. Near the barrel outlet is shown a pressure sensor 20, also working into the electronic control, for setting off the injection stroke when the pressure increases on the reservoir being full. The barrel has passages for temperature control at 21 and the rotor, indirectly through the core 17, likewise at 22.

In operation, compound generally in the form of feed strip, though possibly in the form of pellets, is fed into feed opening 2, taken up by the screw 4 and plasticize in the Transfermix section 5-6, the intensity of the plasticizing/homogenizing action being controlled by the setting of the section 7. In the nowadays frequent case of processor control, the temperatures, screw speed, throttle setting, and the shot-volume will be part of a program, the latter being calculated so as to take into account the influence of the throttle position on the total reservoir space and working out the position of core 17 accordingly. When the plasticize compound has filled the preset shot-volume, a back pressure is exerted in the reservoir and is sensed by the sensor 20 which set off, also as part of the program, the hydraulic forward movement of the screw which, after passing the edge 8 in the barrel, acts completely as a ram. As part of the program, its rotation may then be stopped and likewise the preset hydraulic force appropriate to the molding task will apply.

Unless working on maximum shot-volume, the rotor/ram will contact the back surface of the head 18 of the core 17, carrying this forward to the end of the injection stroke. The combined surface of the ram end and of the head 18 is shaped so as to fit the interior of the outlet end of the barrel, so that there will be no dead space.

The electronic program may provide for the core 17 with its head 18 to remain in the forward position while the rotor is withdrawn to start plasticization for the next shot and to assume programmed position for the next shot-volume when some of the reservoir space has already been filled.

What I claim is:

1. A plasticizing unit for plasticizing material, comprising:
    a barrel having a plasticizing zone portion of a substantially constant inner diameter, an inlet, an outlet axially spaced from the inlet, a generally cylindrical reservoir zone portion axially intermediate the plasticizing zone portion and the outlet, a continuous helical groove formed in the plasticizing zone portion which varies from zero area to full area in the axial direction toward the outlet, and a flow channel communicating the continuous helical groove in the plasticizing zone portion with the reservoir zone portion for flow of plasticized material from the continuous helical groove into the reservoir zone portion;
    a screw disposed in the barrel and having a substantially constant outer diameter portion in which a continuous helical groove is formed, the continuous helical groove varying in cross-section from full area to zero in the axial direction toward the outlet;
    means for selectively axially moving the screw relative to the barrel between a plasticizing axial position in which the continuous helical grooves of the barrel and the screw cooperate with one another to transfer material between one another and thereby effect plasticizing of the material and a material ejection axial position in which the screw is axially closer to the outlet than in its plasticizing axial position, the screw being axially movable from its plasticizing axial position to its material ejection axial position to thereby displace plasticized material out of the reservoir zone portion through the outlet; and
    means for adjustably varying the volumetric capacity of the reservoir zone portion while the screw is maintained in its plasticizing axial position, whereby the volume of plasticized material which is received in the reservoir zone portion can be selectively controlled to a desired shot volume of plasticized material which is subsequently displaced from the reservoir zone portion by the screw.

2. A plasticizing unit for plasticizing material according to claim 1 wherein the means for adjustably varying the volumetric capacity includes a volume displacement member and means for moving the volume displacement member relative to the screw.

3. A plasticizing unit for plasticizing material according to claim 2 wherein the screw includes a bore and the volume displacement member is movable disposed in the bore and the means for relatively moving the volume displacement member includes means for axially moving the volume displacement member relative to the screw.

4. A plasticizing unit for plasticizing material according claim 3 and further comprising means for selectively coupling the volume displacement member and the screw to one another for axial movement of the volume displacement member and the screw as a single unit relative to the barrel.

* * * * *